F. W. MANKER

SOAKING PIT FURNACE

Aug. 9, 1932.

Re. 18,557

Original Filed July 15, 1925 2 Sheets-Sheet 1

Inventor
F. W. MANKER

By His Attorney
Edmund G. Borden

F. W. MANKL.
Aug. 9, 1932. SOAKING PIT FURNACE Re. 18,557
Original Filed July 15, 1925 2 Sheets-Sheet 2
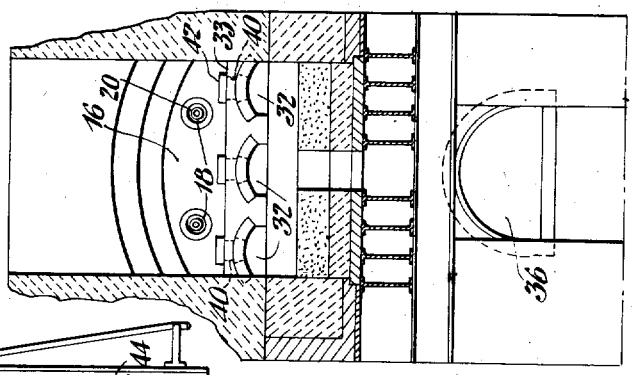
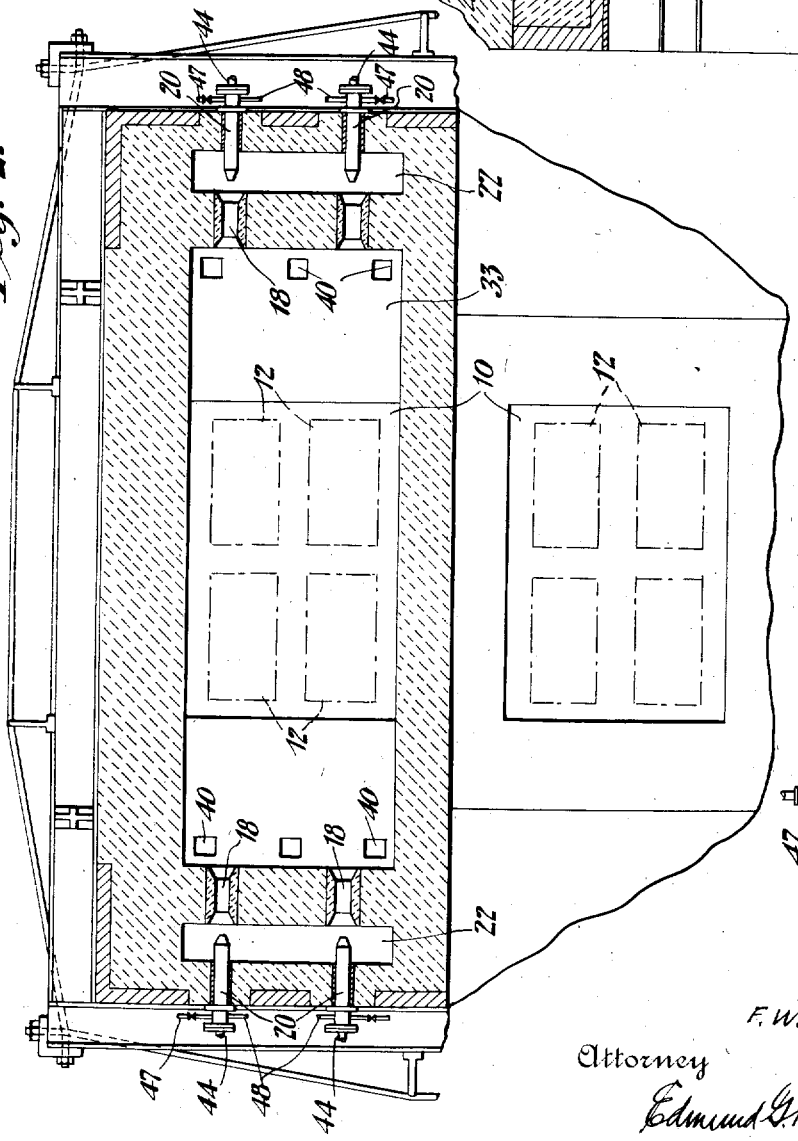
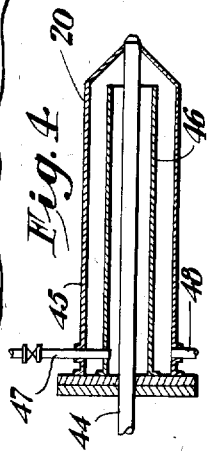
Inventor
F. W. MANKER
Attorney
Edmund G. Bowden Reissued Aug. 9, 1932 Re. 18,557

UNITED STATES PATENT OFFICE

FORREST W. MANKER, OF DETROIT, MICHIGAN, ASSIGNOR TO SURFACE COMBUSTION CORPORATION, OF TOLEDO, OHIO, A CORPORATION OF NEW YORK

SOAKING-PIT FURNACE

Original No. 1,711,273, dated April 30, 1929, Serial No. 43,698, filed July 15, 1925. Application for reissue filed January 13, 1930. Serial No. 420,615.

This invention relates to improvements in furnaces and more particularly to that type of furnace known as soaking pits, such as are used in the steel industry for heating ingots prior to rolling.

Soaking pit furnaces as formerly built have been of the regenerative type which require a checker brick construction on both sides of the pit, one for air and one for gas, together with reversing valves and flues for the same. The ports through which the air and fuel gas pass are, therefore, a compromise between discharge and fuel ports and are thus not of a proper size for either function. Furthermore the gases do not obtain their maximum temperature where most desired, namely, in the pit where the steel is to be heated, the maximum temperature not being reached until the gases are about to pass out of the furnace. This condition occurs because of the inability of the gases to become thoroughly mixed before reaching the discharge or outlet port. The wear on the ports is, therefore, very rapid due to high temperature and is one of the factors contributing to the high cost of maintenance of furnaces of this type.

Regenerative furnaces also require attendants to reverse the flow of gases periodically and require rebuilding of the checker work every 14 to 18 months. Another disadvantage inherent in regenerative furnaces is the inability to control the mixture of gas and air in any one pit since the pits are usually operated in groups of four and operated with one reversing unit. This results in slowing up operations when certain pits are charged with cold steel and others with hot steel.

The present invention has among its objects to provide a soaking pit furnace in which individual control may be had for each pit; to provide a construction which will make unnecessary the reversal of gases and the attendant complicated flue construction, reversing valves and so forth; to provide a pit which may be fired from both sides simultaneously; to provide for the preheating of the air which is to be mixed with the fuel gas; to provide a simple means for regulating the amount of air which mixes with the fuel gas; to provide means for recirculating some of the hot products of combustion whereby to reduce the amount of fuel necessary to maintain the desired temperature in the heating chamber or pit; and to make other improvements in soaking pit furnaces as will more fully appear from the detailed description and accompanying drawings forming part of this specification.

Referring to the drawings wherein the preferred form of furnace is shown.

Fig. 2 is a horizontal section through the furnace taken on line 2—2 of Fig. 1, the view also showing, in plan, an adjacent pit of a series;

Fig. 3 is a vertical transverse section of the furnace on line 3—3 of Fig. 1; and Fig. 4 is a detail view of the fuel-gas nozzle construction showing how the same may be water cooled.

Figure 1:
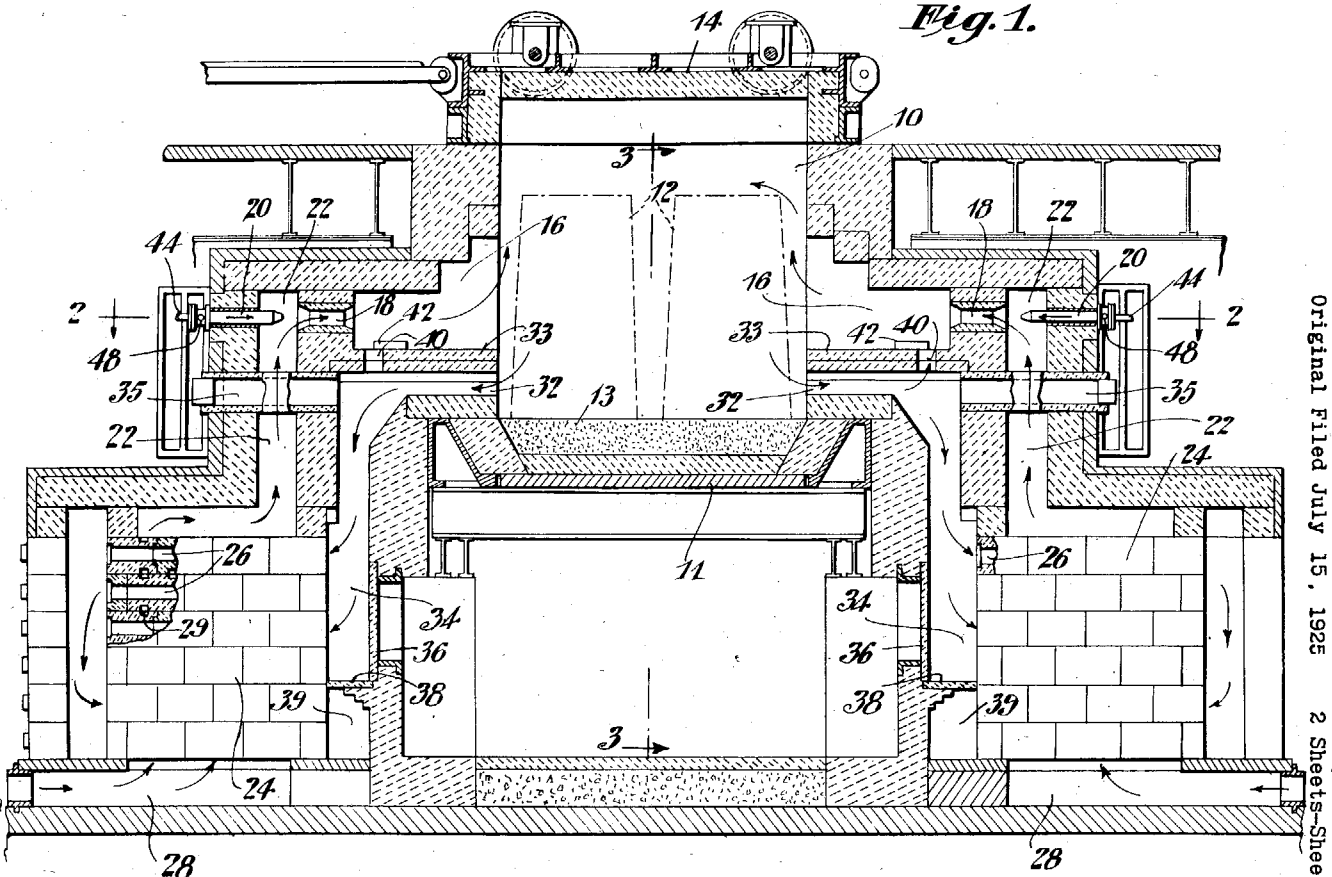
Fig. 1 is a vertical section through the furnace, parts being in elevation and other parts being broken away to more clearly illustrate the construction.

The improved furnace includes a plurality of pits arranged side by side, each pit being a self-contained unit, and similar to the other pits. The drawings have therefore been confined to the illustration of a one-pit furnace construction except in Fig. 2 wherein the second pit of a series has been indicated.

In the drawings, the soaking pit is indicated at 10. The bottom of the pit has a suitably supported floor 11 on which the ingots 12 rest. Between the floor proper and the ingots is a cinder bed 13. The top of the pit is closed by a slidable cover 14 to permit the insertion and removal of the ingots.

In each of two opposite side walls of the pit is provided an expanding throat or combustion chamber 16 which extends from side to side of the pit and has its bottom above the floor of the pit. The fuel mixture of gas and air enters the combustion chamber through a plurality of burner tubes 18 at the restricted end of the combustion chamber, said tubes being made of highly refractory material, preferably carborundum. Mounted in axial alinement with these tubes are the gas nozzles generally indicated at 20. These nozzles are preferably adjustably mounted in the exterior wall of furnace, which wall is in spaced relation to the wall in which the tubes 18 are mounted, whereby there is formed a vertically extending passage 22 between the two walls. This passage communicates with a source of heated air, namely, with a recuperator 24. There are two recuperators for each pit, one for each combustion chamber.

The recuperators are heated by the products of combustion flowing from the pit and are of hollow tile construction through the passages 26 of which the hot gases flow continuously in one direction. The air to be heated enters the recuperators from the bottom through suitable passages 28, the air circulating around the tiles in channels or paths 29 provided around the latter and finally entering the passage 22 into which the gas nozzles 20 extend.

The hot gases flow from the pit to the recuperators by way of horizontally extending passages 32 and a connecting vertically extending passage 34. The passages 32 open into the pit slightly above the coke bed 13 thereof and below the floor 33 of the expanding combustion chamber 16. In order that the heat of the burnt gases may be utilized to the maximum they are first diverted through the upper part of the recuperator by a baffle 38 in front of the same and then through the lower part of the recuperator from whence they pass to the stack by way of a passage 39 below the baffle 38.

Extending across the vertically extending passage 22 leading from the recuperator and in alinement with the horizontally extending passages 32 are hollow tiles through which a suitable tool may be inserted from the outside of the furnace to clean said passages 32. The outer end of these tiles will, of course, be kept closed by suitable plugs when not in use. Dust and the like which accumulates in the bottom of the vertical passage 34 may be removed through a grate or frangible partition 36 above the baffle 38.

As previously indicated the gas nozzles 20 are adjustable in the outer furnace wall toward and from the burner tubes 18. Gas under high pressure is supplied to the nozzles by pipes 44, in order that the gas may entrain heated air from the supply passage 22. By adjusting the distance between the point of the nozzle and the burner tube the amount of air entrained by the jet of gas can be varied to suit conditions. If further adjustment of air and gas is desired the size of the burner tube may also be varied by removing the tube and replacing it by one of the desired size. The discharge opening of the nozzle may also be varied if desired. By controlling the amount of air entrained by the gas, the character of the atmosphere in the heating chamber may be readily controlled, that is to say, the atmosphere can be made a reducing or oxidizing atmosphere at will, it being well understood by those skilled in the art that an oxidizing atmosphere is obtained when the combustible mixture contains an excess of air for complete combustion; that a reducing atmosphere is obtained when the combustible mixture contains a deficiency of air for complete combustion, and that a neutral atmosphere is obtained when the fuel gas and air are present in quantitative proportions for complete combustion. Ordinarily a reducing atmosphere will be desired so as to prevent the formation of scale on the ingots.

It will, of course, be readily understood by those skilled in the art that sufficiently complete mixing of the air and gas will take place in passing through the tubes to render the mixture explosive, that is to say, propagation of inflammation will be substantially instantaneous throughout all parts of the mixture as soon as the velocity of the mixture is reduced by expansion to the rate of flame propagation through the mixture.

Localized heat on those sides of the ingots facing the burners 18 is prevented because of the reduction of velocity of the burning gases in the expanding combustion chamber 16. The heat is therefore a soft mellow heat, the heating gases flowing gently around all sides of the ingots,—the heating gases coming from the opposite combustion chambers meeting each other at the center of the pit and gradually dropping down between the ingots (of which four are shown in a pit) and then passing out of the pit through the bottom side passages 32 on their way to the recuperators and stack, which passages are preferably below the combustion chamber 16 for a purpose hereinafter appearing.

After the combustible mixture leaves the burner tubes, its velocity is so reduced by expansion in the small end of the combustion chamber 16 that combustion immediately takes place in said small end. To further reduce the velocity of the combustion gases and to prevent localization of heat on the face of the ingot the combustion chamber is further expanded as will be readily understood.

One of the important features of the invention is the method of and means for recirculating some of the products of combustion whereby to reduce the amount of fuel needed to maintain the desired temperature in the soaking pit or heating chamber 10. Once the refractory material of which the pit is made has become thoroughly heated, the temperature of the burned gases passing out of the pit will be relatively high. Instead, therefore, of allowing all of the very hot gases constituting the products of combustion to pass to the recuperator, a certain proportion is returned to the pit or, rather to the combustion chamber, there to be reheated by the fresh burning gases entering the pit. Due to the fact that the recirculated gases are already very hot, a comparatively small amount of fuel is needed to raise their temperatures sufficiently to maintain the desired temperature in the pit. The manner in which the burned gases are recirculated will now be explained.

The floor 33 of the combustion chamber is pierced by ports 40 which open onto the lateral passages 32 through which the burned gases pass out of the pit to the recuperator. These ports are located in close proximity to the discharge end of the burner tubes 18 and since the combustible mixture issues from the tubes with considerable velocity, a portion of the burned gases will be induced to flow into the combustion chamber from the passages 32. The amount of burned gases flowing into the combustion chamber through the ports 40 may be readily controlled by regulating the effective size of the ports by means of cover tiles 42 resting on the floor 33 of the combustion chamber. The other portion of burned gases is allowed to flow to the recuperator to heat the air which is used to support combustion of the gases coming from the supply nozzle. Another effect of recirculating some of the burned gases in the manner specified is to further reduce the velocity of the burning gases coming through the burner tubes and thus further mellowing the flames in the pit.

As previously indicated the gas nozzles 20 are preferably water cooled. Cooling may be effected in any approved way but that indicated in Fig. 4 is preferred. The gas-supply pipe or nozzle proper is surrounded by outer and inner shells 45 and 46 respectively. Cold water enters the inner shell by way of a pipe 47, flows toward the jet end of the gas pipe 44 and then back through the outer shell and discharges by way of pipe 48.

It will now be seen that the present construction of soaking pit furnaces provides many decided improvements over soaking pit furnace of the prior art and more particularly over soaking pit furnaces of the regenerative type. By firing the soaking pits from two opposite sides at the same time, a more uniform heat is obtained in the pit and consequently all of the ingots in the pit will be equally heated; by entering the combustible mixture at points considerably removed from the pit proper and effecting a reduction of the velocity of the same by allowing them to expand in a combustion chamber of gradually increasing volume before the gases enter the pit proper, localization of the heat on the face of the ingots facing the combustion chambers is effectually prevented and by recirculating a regulated amount of the products of combustion the quantity of fuel required is reduced to the minimum.

It will also be seen that a very simple and efficacious method has been devised for controlling the mixture of air and gas which enters the combustion chamber, it being merely necessary to move the gas nozzles 20 toward or from their respective burner tubes 18. The closer the tip of the nozzle is to its tube the less air will be drawn into the tube for mixing with the gas, and conversely, the farther the tip is from its tube the greater will be the amount of air drawn in by the jet of gas. Furthermore by heating the air in a recuperator through which the products of combustion are continuously passing, not only is the temperature of the air higher but a constantly uniform temperature of the air is obtained. This feature marks a decided improvement in the art and is one of the factors contributing to the high efficiency of the furnace.

While the improved furnace has been described with considerable particularity of detail, it is to be understood no limitations are intended except as may be defined in the appended claims.

What is claimed is:

1. In a furnace having a heating chamber in the form of a pit, an expanding combustion chamber in each of two opposite side walls of the pit, means at the restricted part of each of said combustion chambers for supplying combustible gases thereto, and means below each of said combustion chambers through which products of combustion may pass out of the pit.

2. In a furnace having a heating chamber in the form of a pit, an expanding combustion chamber in each of two opposite sides of the pit, means at the restricted part of each of said combustion chambers for supplying combustible gases thereto, means extending below each of said combustion chambers through which products of combustion may pass out of the pit, and means for directing some of the products of combustion passing from the last-named means into the combustion chamber.

3. In a furnace having a heating chamber in the form of a pit, an expanding combustion chamber in each of two opposite sides of the pit, means at the restricted part of each of said combustion chambers for supplying combustible gases thereto, means extending below each of said combustion chambers through which products of combustion may pass out of the pit, and means for directing some of the products of combustion passing from the last-named means into the combustion chamber at the restricted portion thereof.

4. In a furnace having a heating chamber in the form of a pit, an expanding combustion chamber in each of two opposite sides of the pit, means at the restricted part of each of said combustion chambers for supplying combustible gases thereto, means extending below each of said combustion chambers through which products of combustion may pass out of the pit, and means for directing some of the products of combustion passing from the last-named means into the combustion chamber, and means for regulating the flow of the products of combustion into the combustion chamber.

5. In a furnace having a heating chamber in the form of a pit, an expanding combustion chamber in each of two opposite side walls of the pit, a plurality of tubes in the restricted part of each of said combustion chambers through which combustible gases may be passed, means in front of said tubes for regulating the gas and air content of the combustible mixture passing therethrough, means below each of said combustion chambers through which products of combustion may flow from the pit, and ports through which some of the products of combustion may pass into the combustion chamber after they have left the pit.

6. In a furnace having a heating chamber in the form of a pit, the combination of a tube through which combustible gases are passed, an expanding combustion chamber in which the gases are expanded before entering the pit, a gas nozzle in axial alinement with said tube and adjustable toward and from the latter, and an air supplying conduit between said tube and the nozzle.

7. In a furnace having a heating chamber in the form of a pit, an expanding combustion chamber leading away from the pit, a burner tube in the restricted part of the combustion chamber and through which tube combustible gases may be passed, a conduit below the combustion chamber through which products of combustion may pass from the pit, and a port connecting said conduit with the combustion chamber at the restricted part thereof whereby some of the products of combustion may be entered into the combustion chamber.

8. In combination, a chamber to be heated, an expanding combustion chamber leading thereto, a tube of highly refractory material in the restricted part of the combustion chamber, means for supplying highly heated air in front of said tube, and a gas nozzle adjustably mounted in front of said tube, the amount of air flowing into the tube being controlled by adjustment of the gas nozzle toward and from the tube, the entraining action of the gas flowing through the nozzle being the effective medium for carrying the air through the tube.

9. In a furnace having a soaking pit the combination with said pit, of a recuperator at each of two opposite sides of the pit, a combustion chamber in each of the said two opposite sides, means at the closed end of each of said combustion chambers through which combustible gases may be passed, a passage between the respective recuperators and tubes for conducting heated air from the recuperators to the tubes, a gas nozzle for each of the tubes, said nozzles extending into said passages and being adjustably mounted with respect to said tubes whereby the amount of air flowing through said tubes may be controlled by the entraining action of a jet of gas passing through said nozzles, and means for leading products of combustion out of the pit for passage through the recuperators, said means comprising passages located below said combustion chambers.

10. In a furnace having a heating chamber, a combustion chamber opening on the heating chamber, a port at the closed end of the combustion chamber through which combustible gases may be entered thereinto, means extending below said combustion chamber through which products of combustion may pass out of the heating chamber, and a port between said last named means and the combustion chamber through which products of combustion may be entered into the combustion chamber.

11. A method of heating ingots contained in a vertical pit comprising simultaneously introducing into the pit above the bottom thereof and from diametrically opposite directions a plurality of streams of burning gases, withdrawing the products of combustion from a plurality of diametrically opposite points below the points of introduction of the burning gases and injecting some of the withdrawn products of combustion into the burning gases before they enter the pit.

12. A soaking pit for ingots having continuously operated direct gas-fired burners on opposite sides thereof and means for continuously exhausting the waste gases from opposite sides of the center of said soaking pit in a uni-directional path.

13. In a soaking pit for heating ingots, said pit comprising a refractory structure having an open-top rectangular ingot chamber formed therein and means for closing the top of the pit, the combination with said pit, of combustion chambers opening into the pit from opposite sides thereof and having a width substantially coextensive with the width of the pit, means positioned at the outer end of each combustion chamber for discharging combustible mixture under pressure thereinto, the discharge opening of said means being of less cross sectional area than the adjacent end of the combustion chamber whereby the mixture on issuing from said means may expand and burn before entering the pit proper, and ports in the walls of the pit through which waste gases may leave the pit.

14. In a soaking pit for heating ingots, said pit comprising a refractory structure having an open-top rectangular ingot chamber formed therein and means for closing the top of the pit, the combination with said pit, of combustion chambers opening into the pit from opposite sides thereof and having a width substantially coextensive with the width of the pit, a restricted passage at the outer end of each combustion chamber, means for supplying combustible mixture under pressure to said passage for discharge into the combustion chamber, and ports in the walls of the pit through which waste gases may leave the pit.

15. In a soaking pit for heating ingots, said pit comprising a refractory structure having an open-top rectangular ingot chamber formed therein and means for closing the top of the pit, the combination with said pit, of combustion chambers opening into the pit from opposite sides thereof and having a width substantially coextensive with the width of the pit, a restricted passage at the outer end of each combustion chamber, means for supplying combustible mixture under pressure to said passage for discharge into the combustion chamber, and ports in the walls of the pit through which waste gases may leave the pit, each combustion chamber at its outer end being relatively restricted as compared with its discharge end, said passage being centrally positioned with respect to the top and bottom walls of said outer end.

16. In a soaking pit for heating ingots, said pit comprising a refractory structure having an open-top rectangular ingot chamber formed therein and means for closing the top of the pit, the combination with said pit, of combustion chambers opening into the pit from opposite sides thereof and having a width substantially coextensive with the width of the pit, means positioned at the outer end of each combustion chamber for discharging combustible mixture under pressure thereinto, the discharge opening of said means being of less cross sectional area than the adjacent end of the combustion chamber whereby the mixture on issuing from said means may expand and burn before entering the pit proper, and ports in the walls of the pit through which waste gases may leave the pit, said ports being beneath the combustion chambers.

17. In a soaking pit for heating ingots, said pit comprising a refractory structure having an open-top rectangular ingot chamber formed therein and means for closing the top of the pit, the combination with said pit, of combustion chambers opening into the pit from opposite sides thereof and having a width substantially coextensive with the width of the pit, means positioned at the outer end of each combustion chamber for discharging combustible mixture under pressure thereinto, the discharge opening of said means being of less cross sectional area than the adjacent end of the combustion chamber whereby the mixture on issuing from said means may expand and burn before entering the pit proper, and means for introducing waste heating gases from the pit into the combustion chambers inwardly of the discharge end thereof.

In testimony whereof I have hereunto set my hand.

FORREST W. MANKER.